Aug. 30, 1932. J. SANON 1,874,632
FASTENER
Filed Sept. 19, 1931
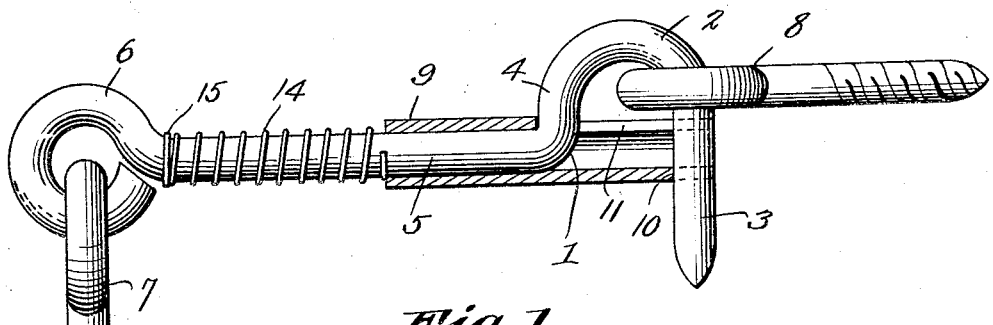
Fig. 1.
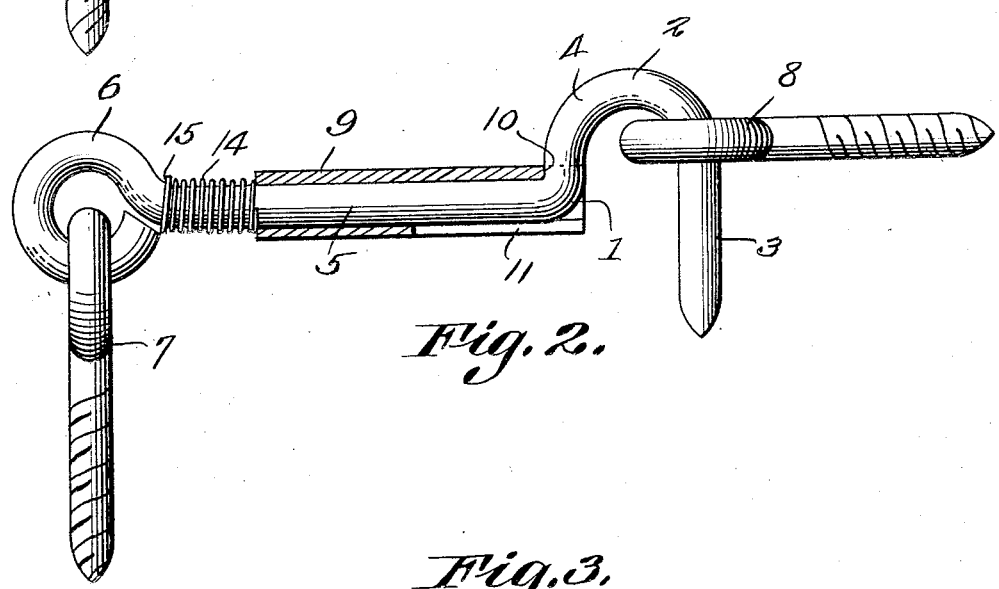
Fig. 2.
Fig. 3.
Inventor
Joseph Sanon Patented Aug. 30, 1932

1,874,632

UNITED STATES PATENT OFFICE

JOSEPH SANON, OF NEW PHILADELPHIA, OHIO

FASTENER

Application filed September 19, 1931. Serial No. 563,863.

This invention aims to provide a simple fastener, including a hook, novel means being supplied for opening and closing the hook at the will of an operator.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Figure 1 shows in side elevation, a device constructed in accordance with the invention, the sleeve being in section, and the sleeve being in closed position;

Figure 2 is very similar to Figure 1, the sleeve having been retracted;

Figure 3 is a plan of the sleeve.

In carrying out the invention, there is provided a hook 1 including a curved bill 2, including a finger 3, and an oppositely disposed arm 4 connecting the bill 2 with the straight shank 5 of the hook. The shank 5 may be supplied with any desired means for mounting it in place. As shown, but not of necessity, the shank 5 terminates in an eye 6 pivotally engaged with an anchor 7, which may be a screw eye. The finger 3 of the hook 1 is adapted to engage with a keeper 8, which may be a screw eye.

A tubular sleeve 9 is mounted for rotation and for longitudinal sliding adjustment on the shank 5 of the hook 1. The sleeve 9 is provided with a short notch 10, and with a long notch 11 disposed oppositely to the notch 10. A compression spring 14 is located about the shank 5 of the hook 1, one end of the spring bearing against the rear end of the sleeve 9, and the opposite end of the spring engaging a washer 15, which, in turn, is engaged by the eye 6, the eye, therefore, forming an abutment for the spring.

The spring 14 advances the sleeve 9 until the notch 10 receives the finger 3, both the finger 3 and the arm 4 being received in the notch 11, as in Figure 1. The sleeve 9 then extends across the concavity of the hook 1, and the hook cannot escape from the keeper 8. The sleeve 9 can be pulled back, thereby compressing the spring 14, the sleeve being rotated one hundred and eighty degrees about the shank 5 until the notch 10 is in line with the arm 4 of the hook. When the sleeve 9 is released, the spring 14 will carry the sleeve to the right in Figures 1 and 2, until the arm 4 of the hook is engaged with the notch 10. The sleeve 9, thus, is held in the retracted position of Figure 2, and the sleeve cannot be rotated accidentally, and be advanced by the spring 14, because the notch or seat 12 is engaged with the arm 4 of the hook.

Having thus described the invention, what is claimed is:

1. In a device of the class described, a hook comprising a shank and a bill, the bill comprising a free ended finger, and an oppositely disposed arm connecting the bill with the shank, a sleeve slidable on the shank, the sleeve being provided in its end with oppositely disposed notches of different depths, the shallower notch receiving the finger, and the deeper notch receiving the arm and the finger, when the sleeve extends across the bill, the sleeve being rotatable and rearwardly slidable to engage the shallower notch with the arm when the sleeve is retracted to open the bill, and spring means for advancing the sleeve.

2. In a device of the class described, a hook comprising a shank and a bill, the bill comprising a free ended finger, and an arm connecting the bill with the shank, a sleeve slidable on the shank and having oppositely disposed notches, one notch receiving the finger, and the other notch receiving the arm, the sleeve being rearwardly slidable on the shank to open the bill of the hook, and being rotatable to engage behind the arm, thereby to hold the sleeve in open position with respect to the bill, and spring means for advancing the sleeve.

In testimony that I claim the foregoing as my own, I have hereto affixed my signature.

JOSEPH SANON.